United States Patent
Vig et al.

(10) Patent No.: US 12,128,889 B2
(45) Date of Patent: Oct. 29, 2024

(54) ADAPTIVE MESSAGING WITHIN A CLOUD AND EDGE COMPUTING ENVIRONMENT FOR V2X APPLICATIONS

(71) Applicant: GM Global Technology Operations LLC, Detroit, MI (US)

(72) Inventors: Sandeep Vig, Oakland Township, MI (US); Bo Yu, Troy, MI (US); Ashok Yendluri, Farmington, MI (US); Vivek Vijaya Kumar, Shelby Township, MI (US); Hariharan Krishnan, Troy, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 17/565,959

(22) Filed: Dec. 30, 2021

(65) Prior Publication Data
US 2023/0211779 A1    Jul. 6, 2023

(51) Int. Cl.
*B60W 30/095*    (2012.01)
*H04W 4/44*    (2018.01)

(52) U.S. Cl.
CPC .... *B60W 30/0956* (2013.01); *B60W 30/0953* (2013.01); *H04W 4/44* (2018.02); *B60W 2420/403* (2013.01); *B60W 2552/53* (2020.02)

(58) Field of Classification Search
CPC ......... B60W 30/0956; B60W 30/0953; B60W 2552/53; B60W 2420/403; H04W 4/44
See application file for complete search history.

(56) References Cited

U.S. PATENT DOCUMENTS

| 11,582,652 | B2* | 2/2023 | Kim ............... H04W 56/001 |
| 2014/0369280 | A1* | 12/2014 | Diachina ........... H04W 52/0229 370/329 |
| 2015/0078291 | A1* | 3/2015 | Guner ............... H04W 74/0891 370/329 |
| 2016/0155333 | A1* | 6/2016 | Strassberger .......... G08G 1/161 340/902 |
| 2017/0053530 | A1* | 2/2017 | Gogic ..................... H04L 67/12 |

(Continued)

FOREIGN PATENT DOCUMENTS

| JP | 2001061185 A | * | 3/2001 | |
| KR | 20180044992 A | * | 5/2018 | |
| WO | WO-2023060275 A1 | * | 4/2023 | ............ B60W 50/10 |

OTHER PUBLICATIONS

Machine translation JP-2001061185-A (Year: 2001).*
Machine translation KR 20180044992 A (Year: 2018).*

*Primary Examiner* — Hussein Elchanti
*Assistant Examiner* — Kenneth M Dunne
(74) *Attorney, Agent, or Firm* — Vivacqua Crane, PLLC

(57) ABSTRACT

A system comprises a computer including a processor and a memory. The memory includes instructions such that the processor is programmed to: receive safety messages from a plurality of vehicles in communication with the edge server, determine an uplink frequency recommendation for transmitting safety messages from at least one vehicle of the plurality of vehicles based on at least one of a position error or a collision risk, determine a downlink frequency recommendation for transmitting safety messaging to at least one vehicle of the plurality of vehicles based on at least one of a position error or a collision risk, and transmit the frequency recommendations to the at least one vehicle.

20 Claims, 7 Drawing Sheets

(56) References Cited

U.S. PATENT DOCUMENTS

| | | | |
|---|---|---|---|
| 2017/0193822 A1* | 7/2017 | Song | H04W 4/46 |
| 2021/0118295 A1* | 4/2021 | Visintainer | G01S 19/13 |
| 2022/0227360 A1* | 7/2022 | Delhaye | H04W 4/44 |
| 2022/0319329 A1* | 10/2022 | Kim | B60W 40/04 |
| 2022/0388505 A1* | 12/2022 | Sharma Banjade | G08G 1/005 |
| 2023/0060940 A1* | 3/2023 | Avedisov | G08G 1/165 |
| 2023/0209476 A1* | 6/2023 | Kim | H04W 52/36 |
| | | | 370/311 |
| 2023/0377460 A1* | 11/2023 | Sivanesan | H04W 4/44 |

* cited by examiner

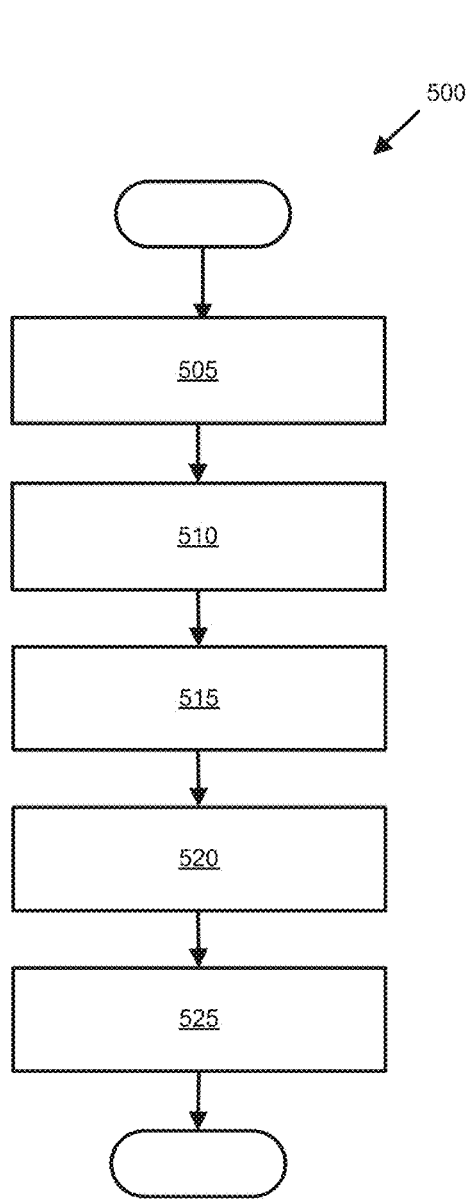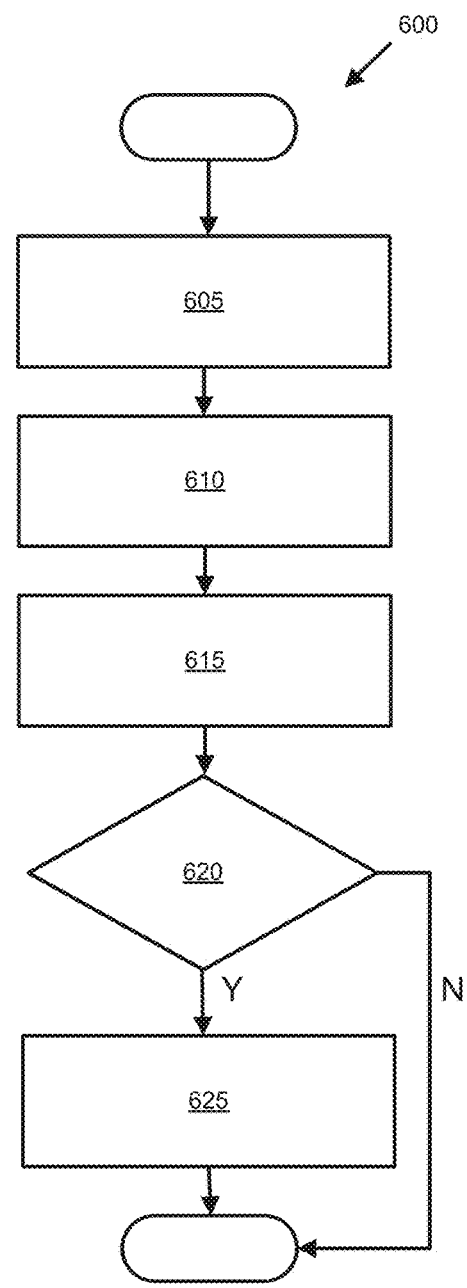

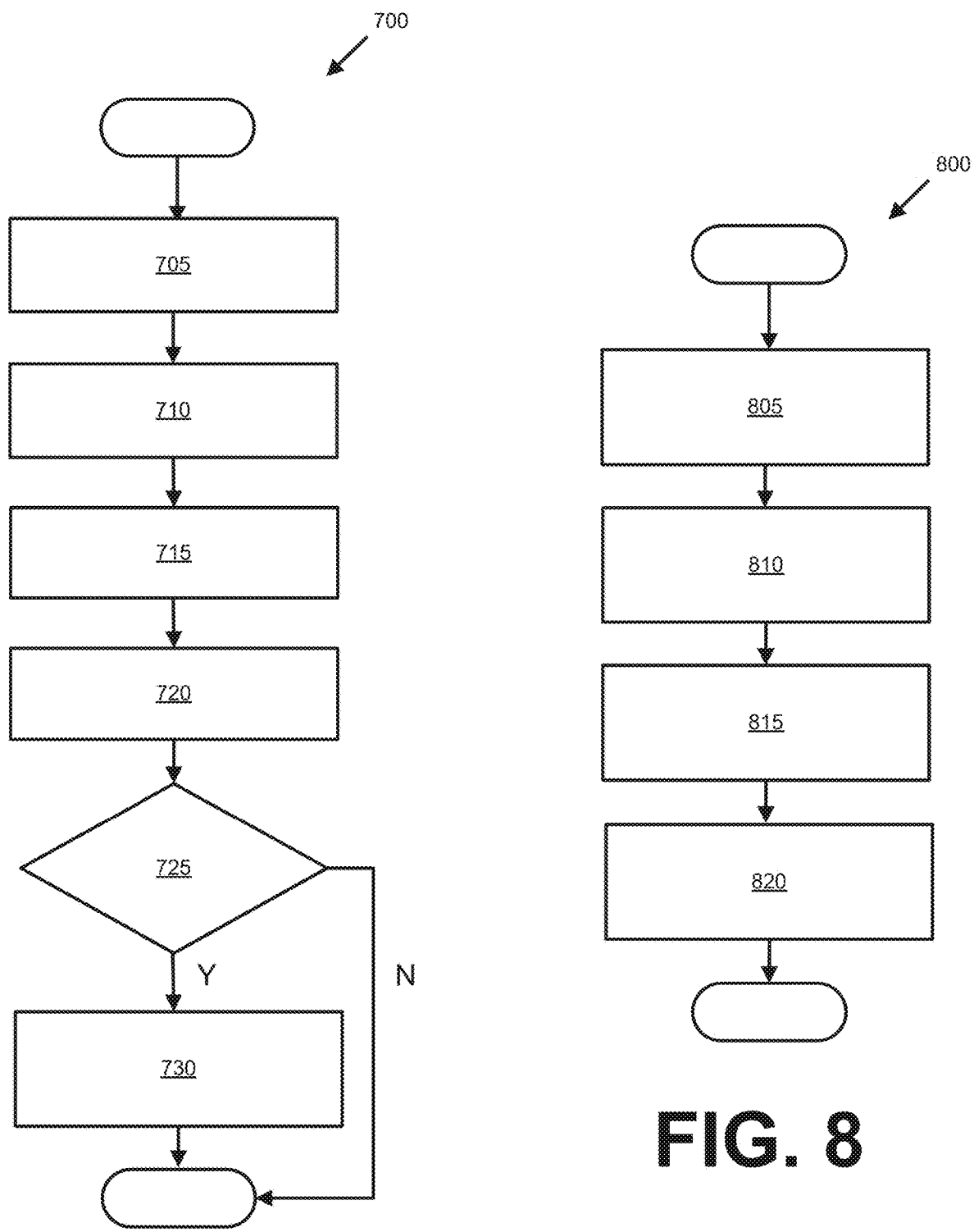

ADAPTIVE MESSAGING WITHIN A CLOUD AND EDGE COMPUTING ENVIRONMENT FOR V2X APPLICATIONS

INTRODUCTION

The present disclosure relates to selecting an optimized frequency to transmit uplink and downlink messages in vehicle to cloud (V2C) or vehicle to network (V2N) communications.

Vehicles can transmit basic safety messages that include information about a vehicle position, heading, speed, and/or predicted path. These safety messages can be transmitted within an environment to other vehicles using cloud/edge computing services and V2C and V2N communication technologies. Cloud computing and edge computing can be used to support various V2X use cases, such as vehicle to vehicle (V2V), vehicle to infrastructure (V2I), vehicle to pedestrian (V2P), etc.

SUMMARY

A system comprises a computer including a processor and a memory. The memory includes instructions such that the processor is programmed to: receive safety messages from a plurality of vehicles in communication with the edge server, determine an uplink frequency recommendation for transmitting safety messages from at least one vehicle of the plurality of vehicles based on at least one of a position error or a collision risk, and transmit the frequency recommendation to the at least one vehicle.

In other features, the processor is further programmed to determine a downlink frequency for transmitting safety messages to the at least one vehicle, wherein the transmitted safety messages comprise safety data corresponding to other vehicles of the plurality of vehicles.

In other features, the processor is further programmed to determine the downlink frequency based on a probability of a collision between the at least one vehicle and another vehicle of the plurality of vehicles.

In other features, the processor is further programmed to determine the downlink frequency by accessing a lookup table that relates the probability of the collision to the downlink frequency.

In other features, the processor is further programmed to receive safety messages from the at least one vehicle at an uplink frequency corresponding to the uplink frequency recommendation.

In other features, the processor is further programmed to instantiate a plurality of frequency determination modules for each vehicle of the plurality of vehicles.

In other features, the processor is further programmed to calculate a probability of a trajectory crossing for each pair of vehicles within the plurality of vehicles, wherein the probability of the trajectory crossing represents a probability of a collision.

In other features, the processor is further programmed to provide the probability of the trajectory crossing to at least one frequency determination module.

In other features, the processor is further programmed to receive sensor data from a vehicle-to-infrastructure (V2I) device, the sensor data comprises sensed data pertaining to at least one vehicle of the plurality of vehicles.

In other features, the vehicle-to-infrastructure (V2I) device comprises at least one of a roadside device, a traffic light, or a camera.

A method includes receiving, at an edge server, safety messages from a plurality of vehicles in communication with the edge server, determining, at the edge server, an uplink frequency recommendation for transmitting safety messages from at least one vehicle of the plurality of vehicles based on at least one of a position error or a collision risk, and transmitting the frequency recommendation to the at least one vehicle.

In other features, the method further includes determining a downlink frequency for transmitting safety messages to the at least one vehicle, wherein the transmitted safety messages comprise safety data corresponding to other vehicles of the plurality of vehicles.

In other features, the method further includes determining the downlink frequency based on a probability of a collision between the at least one vehicle and another vehicle of the plurality of vehicles.

In other features, the method further includes determining the downlink frequency by accessing a lookup table that relates the probability of the collision to the downlink frequency.

In other features, the method further includes receiving safety messages from the at least one vehicle at an uplink frequency corresponding to the uplink frequency recommendation.

In other features, the method further includes instantiating a plurality of frequency determination modules for each vehicle of the plurality of vehicles.

In other features, the method further includes calculating a probability of a trajectory crossing for each pair of vehicles within the plurality of vehicles, wherein the probability of the trajectory crossing represents a probability of a collision.

In other features, the method further includes providing the probability of the trajectory crossing to at least one frequency determination module.

In other features, the method further includes receiving sensor data from a vehicle-to-infrastructure (V2I) device, the sensor data comprises sensed data pertaining to at least one vehicle of the plurality of vehicles.

In other features, wherein the vehicle-to-infrastructure (V2I) device comprises at least one of a roadside device, a traffic light, or a camera.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a flow diagram illustrating an example process for determining a recommended uplink frequency;

FIG. 6 is a flow diagram illustrating an example process for determining whether to update an uplink frequency recommendation;

FIG. 7 is a flow diagram illustrating an example process for determining whether to update an uplink frequency recommendation;

FIG. 8 is a flow diagram illustrating an example process for determining a probability of a collision between multiple vehicles;

DETAILED DESCRIPTION

The following description is merely exemplary in nature and is not intended to limit the present disclosure, application, or uses.

Some vehicles, such as autonomous vehicles, employ cloud computing and edge computing services to communicate with other vehicles, infrastructure, and pedestrians. Cloud computing and edge computing can support vehicle-to-vehicle (V2V), vehicle-to-infrastructure (V2I), and vehicle-to-pedestrian (V2P), collectively known as V2X, use cases, enhancing vehicle and pedestrian safety. Cloud computing and edge computing allow vehicles to communicate with other vehicles, infrastructure, and/or pedestrians, using wireless communications technologies such as, but not limited to, cellular, Bluetooth®, IEEE 802.11, dedicated short range communications (DSRC), ultra-wideband (UWB), and/or wide area networks (WAN).

Within Intelligent Transportation Systems (ITS), roadside devices may be located along one or more roadways to capture vehicle-generated traffic data and provide information, such as traffic advisories, from the infrastructure, e.g., roadside device, to cloud and edge, and then to vehicles to inform the driver and/or vehicle of safety, mobility, and/or environment-related conditions. In some instances, roadside devices are positioned within signalized intersections to provide information to the vehicles traveling proximate to the signalized intersection.

Figure 1:
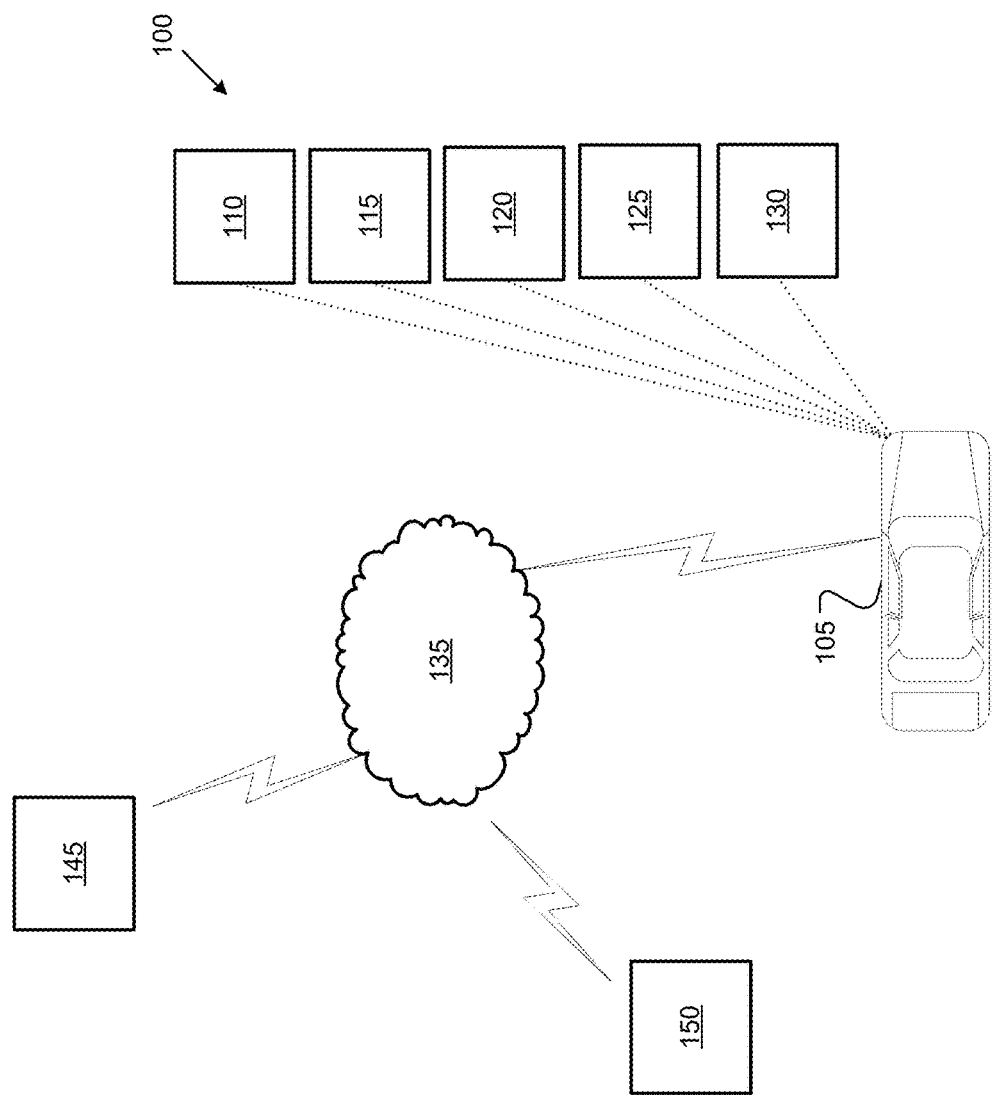
FIG. 1 is a block diagram of an example system including a vehicle.

FIG. 1 is a block diagram of an example vehicle system 100. The system 100 includes a vehicle 105, which can comprise a land vehicle such as a car, truck, etc., an aerial vehicle, and/or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145, such as an edge server. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

The system 100 also includes an infrastructure device 150, which can communicate with the server 145 and the vehicle 105 via the communication network 135. While only a single infrastructure devices 150 is illustrated, it is understood that the system 100 can include multiple infrastructure devices 150 deployed throughout a traffic environment traversable by the vehicle 105. The infrastructure device 150 may comprise roadside devices, traffic lights, cameras attached to structures, or any other Vehicle-to-Infrastructure (V2I) devices.

Figure 2:
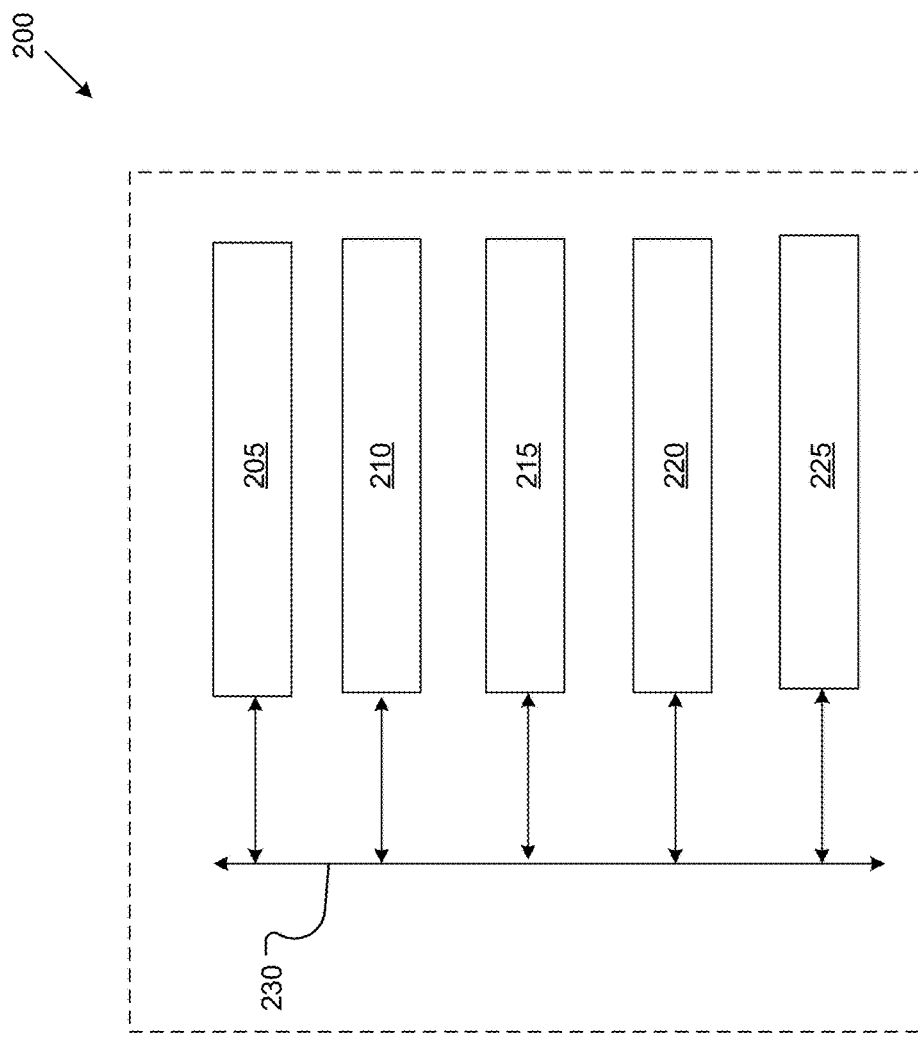
FIG. 2 is a block diagram of an example computing device.

FIG. 2 illustrates an example computing device 200 i.e., computer 110 and/or server(s) 145 that may be configured to perform one or more of the processes described herein. As shown, the computing device can comprise a processor 205, memory 210, a storage device 215, an I/O interface 220, and a communication interface 225. Furthermore, the computing device 200 can include an input device such as a touchscreen, mouse, keyboard, etc. In certain implementations, the computing device 200 can include fewer or more components than those shown in FIG. 2.

In particular implementations, processor(s) 205 includes hardware for executing instructions, such as those making up a computer program. As an example, and not by way of limitation, to execute instructions, processor(s) 205 may retrieve (or fetch) the instructions from an internal register, an internal cache, memory 210, or a storage device 215 and decode and execute them.

The computing device 200 includes memory 210, which is coupled to the processor(s) 205. The memory 210 may be used for storing data, metadata, and programs for execution by the processor(s). The memory 210 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 210 may be internal or distributed memory.

The computing device 200 includes a storage device 215 includes storage for storing data or instructions. As an example, and not by way of limitation, storage device 215 can comprise a non-transitory storage medium described above. The storage device 215 may include a hard disk drive (HDD), flash memory, a Universal Serial Bus (USB) drive or a combination of these or other storage devices.

The computing device 200 also includes one or more input or output ("I/O") devices/interfaces 220, which are provided to allow a user to provide input to (such as user strokes), receive output from, and otherwise transfer data to and from the computing device 200. These I/O devices/interfaces 220 may include a mouse, keypad or a keyboard, a touch screen, camera, optical scanner, network interface, modem, other known I/O devices or a combination of such I/O devices/interfaces 220. The touch screen may be activated with a writing device or a finger.

The I/O devices/interfaces 220 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 220 is configured to provide graphical data to a display for presentation to a user. The graphical data may be representative of one or more graphical user interfaces and/or any other graphical content as may serve a particular implementation.

The computing device 200 can further include a communication interface 225. The communication interface 225 can include hardware, software, or both. The communication interface 225 can provide one or more interfaces for communication (such as, for example, packet-based communication) between the computing device and one or more other computing devices 200 or one or more networks. As an example, and not by way of limitation, communication interface 225 may include a network interface controller (NIC) or network adapter for communicating with an Ethernet or other wire-based network or a wireless NIC (WNIC) or wireless adapter for communicating with a wireless network, such as a WI-FI. The computing device 200 can further include a bus 230. The bus 230 can comprise hardware, software, or both that couples components of the computing device 200 to each other.

Vehicles 105 within communication range of the server 145 can transmit safety data encapsulated as safety messages. The safety data can include, but is not limited to, GPS location data, vehicle speed data, vehicle heading data, vehicle path planning data, yaw data, etc., to the server 145, which can be referred to as an uplink communication channel. Vehicles 105 within communication range of the server 145 can also receive safety data corresponding to other vehicles 105 via a downlink communication channel. It is understood that data transmitted to and/or from the server 145 can be transmitted at various frequencies, as described in greater detail below.

Figure 3:
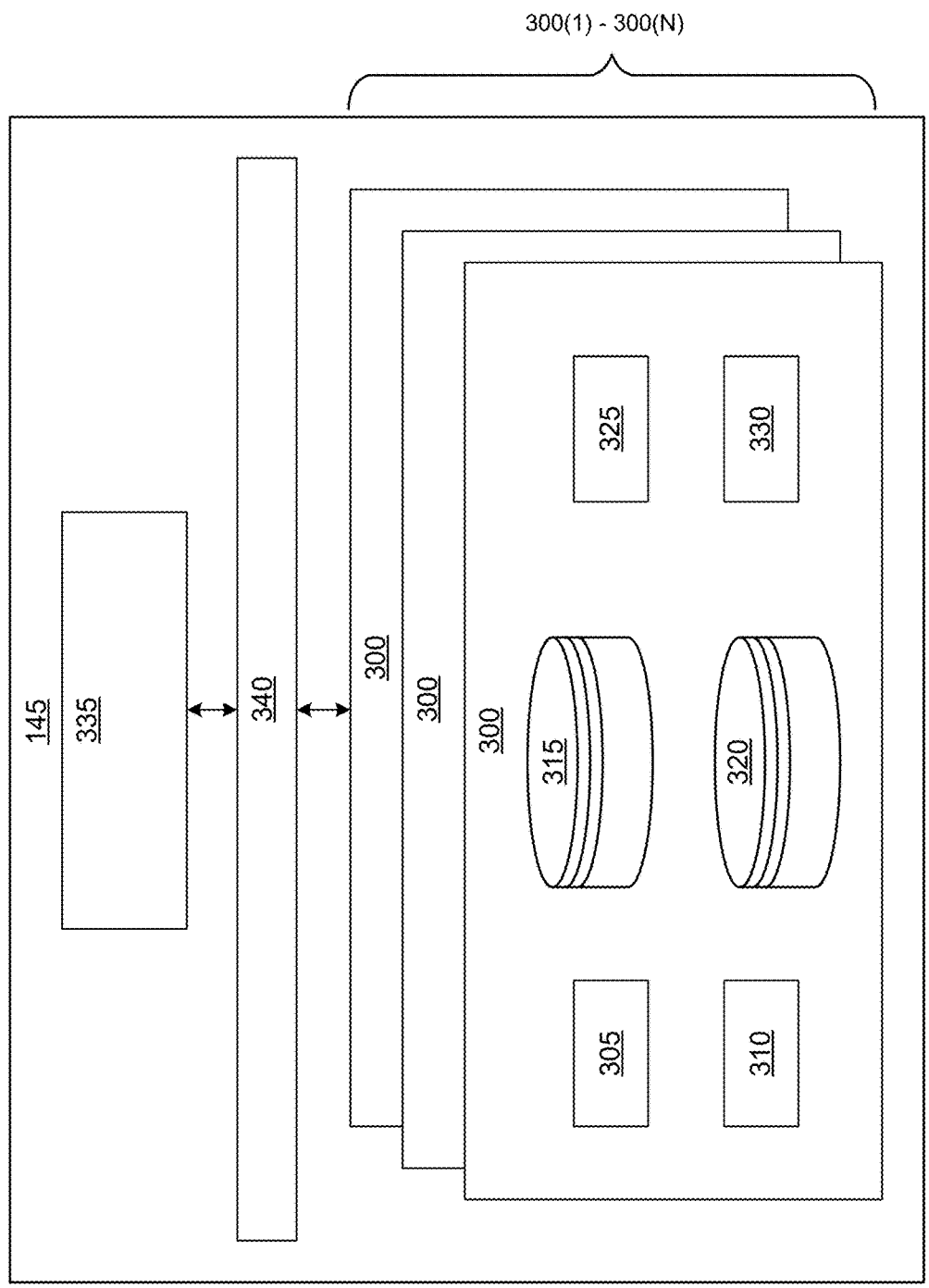
FIG. 3 is a block diagram of an example edge server.

FIG. 3 illustrates an example server 145, e.g., an edge server, that includes at least one frequency determination module 300. It is understood that the server 145 may instantiate a frequency determination module 300 for each vehicle 105 in communication with the server 145 as represented by frequency determination modules 300(1) through 300(N), where N is an integer greater than or equal to two (2).

Each frequency determination module 300 includes a motion tracking module 305, a motion prediction module 310, a motion determination module 315, a collision determination module 320, an uplink recommendation module 325, and a downlink determination module 330.

The motion tracking module 305 uses the safety data uploaded from the vehicle 105, i.e., the ego-vehicle, to update the ego-vehicle's motion model using suitable motion modeling techniques. The motion prediction module 310 predicts a vehicle status of the ego-vehicle via suitable vehicle status determination techniques. In various implementations, the motion prediction module 310 can estimate the ego-vehicle's status when there is latency or temporary interruption in the uplink communication channel.

The motion determination module 315 comprises a sensor fusion model, such as a Bayesian Filter, that fuses sensor data received from the ego-vehicle, other vehicles connected to the server 145, and/or infrastructure devices 150 connected to the server 145. For example, the infrastructure devices 150 can provide sensor data that comprises sensed data representing one or more vehicles 105 within the sensed environment.

The collision determination module 320 can estimate a potential risk of a collision of the ego-vehicle with another vehicle 105 based on suitable collision determination techniques. For example, the collision determination module 320 can estimate a probability of the ego-vehicle being in a collision with another vehicle 105 based on the fused sensor data received from the motion determination module 315.

The uplink recommendation module 325 can determine a recommended frequency for transmitting safety data from the ego-vehicle, e.g., vehicle 105, to the server 145. The uplink recommendation module 325 can determine the recommended frequency based on at least a position estimation error that is determined by the motion determination module 315 using the fused sensor data and/or the potential collision risk as determined by the collision determination module 320 as discussed in greater detail below. In some examples, the uplink recommendation module 325 determines the uplink recommendation based on the sensed data from the infrastructure device 150. For instance, the uplink recommendation module 325 can determine that a relatively slower uplink frequency can be used when the sensor data includes sensed data representing the ego-vehicle.

The downlink determination module 330 determines a frequency for transmitting safety data, i.e., safety data provided by other vehicles 105, from the server 145 to the ego-vehicle, which is described in greater detail below. As a result, the downlink determination module 330 can allow for different message exchanging rates between any pair of vehicles 105 in communication with the server 145.

The server 145 can also include a global collision risk estimator 335 that can communicate with each frequency determination module 300 via a bus 340. The bus 340 can comprise hardware, software, or both that couples the global collision risk estimator 335 and the modules 300(1) through (N) to each other. The global collision risk estimator 335 is described in greater detail below.

Figure 4:
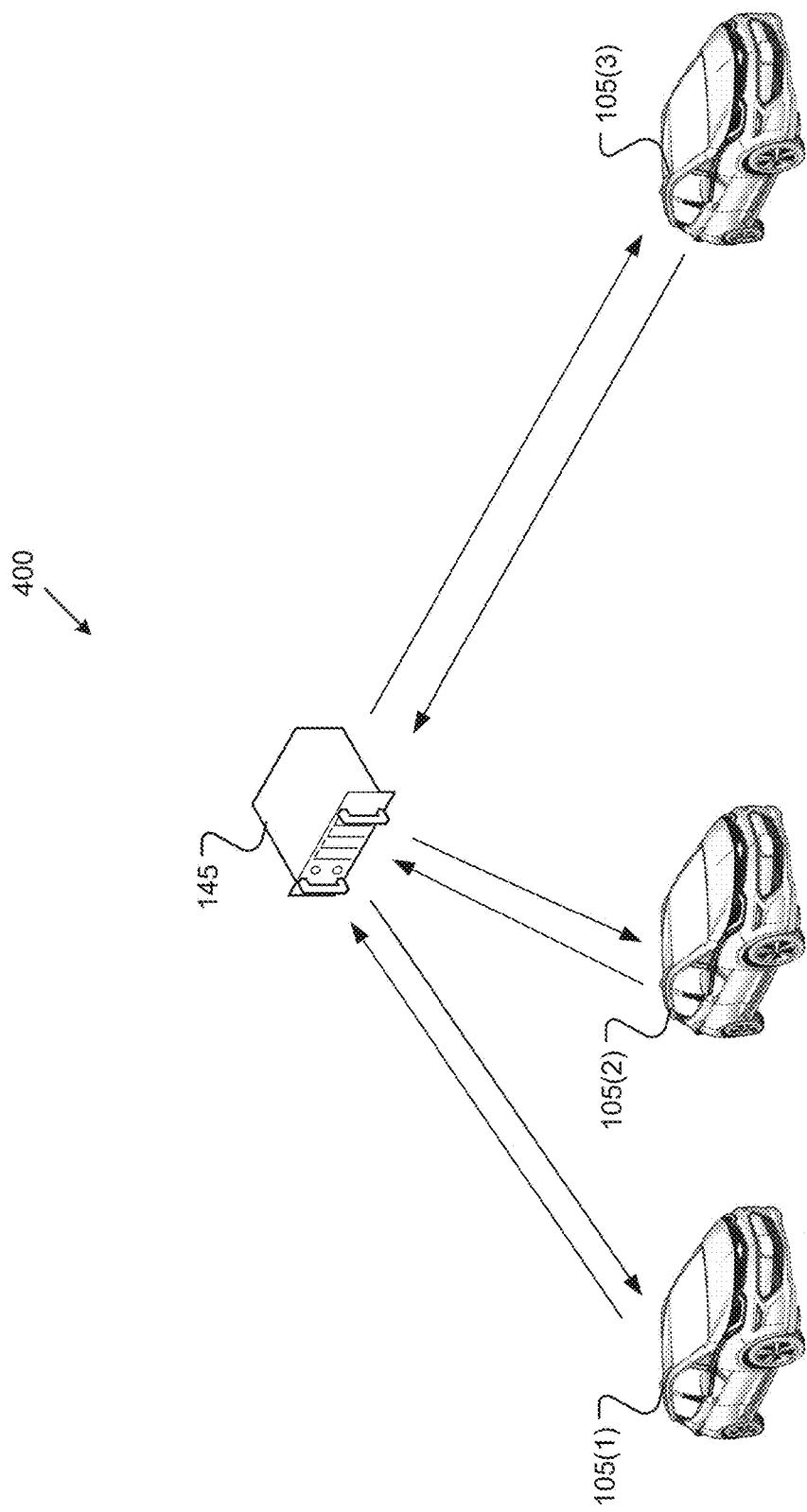
FIG. 4 is a diagram of an example environment including a plurality of vehicles communicatively connected to an edge server.

FIG. 4 illustrates an example environment 400 including vehicles 105(1) through 105(3). The vehicles 105(1) through 105(3) may be traversing a roadway and are communicatively connected to the server 145. Based on the proximity of vehicle 105(1) to vehicle 105(2) relative to vehicle 105(3), the frequency of transmitting and/or receiving safety data to and/or from the vehicles 105(1), 105(2) can be greater with respect to the frequency of transmitting and/or receiving safety data to and/or from vehicle 105(3). The computer 110 of the ego-vehicle, i.e., vehicle 105(1), may determine one or more vehicle actions to take based on safety data received from the server 145. The received safety data can comprise safety data provided to the server 145 from the neighboring vehicle 105(2).

FIG. 5 illustrates an example process 500 for determining a recommended uplink frequency at the server 145. Blocks of the process 500 can be executed by the server 145. At block 505, safety data is received from the vehicle 105, e.g., the ego-vehicle. At block 510, the motion tracking module 305 compares the uploaded safety data to stored safety data for the vehicle 105 to calculate safety data errors based on a difference between the uploaded safety data and the stored safety data.

At block 515, the motion determination module 315 updates the fused sensor data and the potential collision risk using the uploaded safety data. For example, the motion determination module 315 can determine a position estimation error by comparing the motion model determined by the server 145 with the motion of the ego-vehicle as determined using the safety data transmitted to the server 145.

At block 520, the uplink recommendation module 325 determines a recommended frequency for transmitting safety data from the vehicle 105 to the server 145. The uplink recommendation module 325 can maintain one or more feedback control models that can continuously or periodically update the recommend frequency based on uploaded safety data and/or the safety data errors. At block 525, the recommended frequency is encapsulated into a message that is transmitted to the vehicle 105. The process 500 then ends.

FIG. 6 illustrates an example process 600 for determining whether to update an uplink frequency recommendation. Blocks of the process 600 can be executed by the computer 110. At block 605, the computer 110 determines a frequency for transmitting safety data to the server 145 based on current vehicle kinematics, such as vehicle speed, vehicle direction, and the like. For example, in an example implementation, the computer 110 may set a frequency to ten Hertz (10 Hz) when the vehicle 105 is traveling at seventy miles per hour (70 mph) and may set a frequency to two Hertz (2 Hz) when the vehicle 105 is traveling at ten miles per hour (10 mph).

At block 610, the safety data generated based on the sensor data is transmitted to the server 145 at the determined frequency. At block 615, the computer 110 receives the recommended frequency from the server 145.

At block 620, the computer 110 determines whether to update the frequency determined at block 605. The computer 110 can determine whether to update the frequency based on the recommended frequency, current vehicle status as determined by the vehicle 105 based on the perceived environment, and/or sensor data from the sensors 115. For example, the computer 110 can fuse the recommended frequency, the current vehicle status, and the sensor data to determine whether to update the frequency. The fusion may comprise a maximum function of the recommended frequency, the current vehicle status, and the sensor data. If yes from block 620, the computer 110 updates the frequency at block 625, and the process 600 ends. Otherwise, the process 600 ends.

FIG. 7 illustrates another example process 700 for determining whether to update an uplink frequency recommendation. Blocks of the process 700 can be executed by the computer 110. At block 705, the computer 110 determines a frequency for transmitting safety data to the server 145 based on current vehicle kinematics, such as vehicle speed, vehicle direction, and the like.

At block 710, the computer 110 determines a motion model for the vehicle 105 based on the vehicle's 105 safety data. The computer 110 can determine a motion model for the vehicle 105 using suitable motion modeling techniques based on the safety data At block 715, the vehicle motion model is transmitted to the server 145 at the determined frequency. The server 145 can use the vehicle model to predict the vehicle's 105 movement and/or trajectory. At block 720, the computer 110 receives the recommended frequency from the server 145.

At block 725, the computer 110 determines whether to update the frequency determined at block 705. The computer 110 can determine whether to update the frequency based on the recommended frequency, current vehicle status as determined by the vehicle 105 based on the perceived environment, and/or sensor data from the sensors 115. For example, the computer 110 can fuse the recommended frequency, the current vehicle status, and the sensor data to determine whether to update the frequency. The fusion may comprise a maximum function of the recommended frequency, the current vehicle status, and the sensor data. If yes from block 725, the computer 110 updates the frequency at block 730, and the process 700 ends. Otherwise, the process 700 ends.

FIG. 8 illustrates an example process 800 for determining a probability of a collision between multiple vehicles. Blocks of the process 800 can be executed by the server 145. At block 805, the global collision risk estimator 335 issues a command requesting each frequency determination module 300(1) through 300(N) to estimate the corresponding vehicle's 105 status. At block 810, the global collision risk estimator 335 calculates each vehicle's 105 predicted movement trajectory based on the motion model provided by each frequency determination module 300(1) through 300(N).

At block 815, the global collision risk estimator 335 calculates a probability of trajectory crossing for each pair of vehicles 105. The calculated probability can represent a probability of collision between each pair of vehicles 105. At block 820, the global collision risk estimator 335 provides the calculated probability to the corresponding frequency determination module 300(1) through 300(N). The process 800 then ends.

Figure 9:
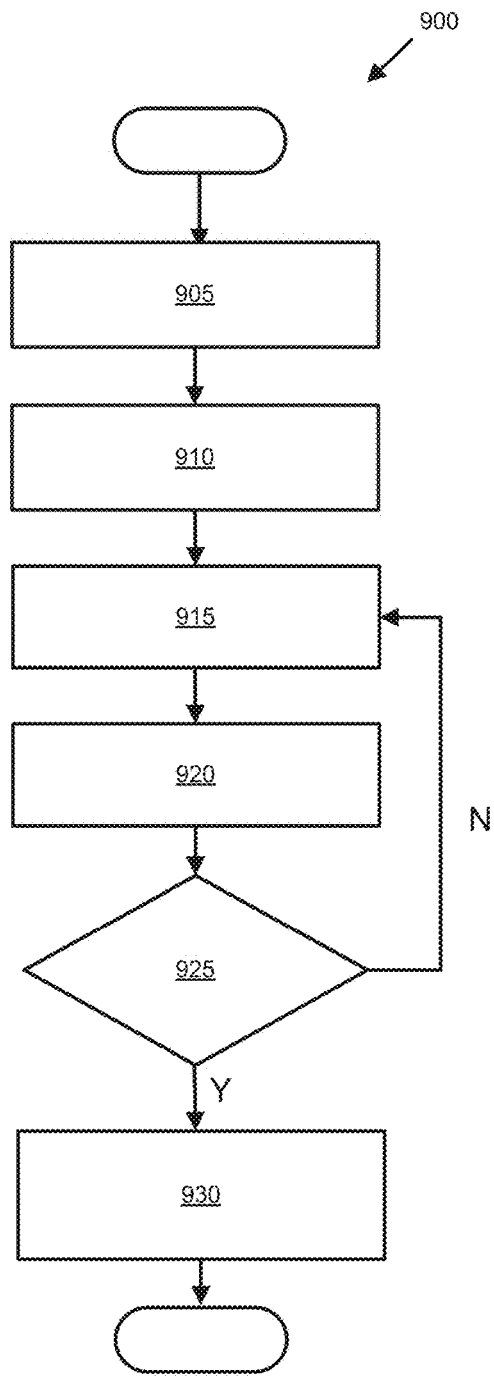
FIG. 9 is a flow diagram illustrating an example process for transmitting a downlink update message to an ego-vehicle.

FIG. 9 illustrates an example process 900 for transmitting a downlink update message to an ego-vehicle 105. Blocks of the process 900 can be executed by the server 145. At block 905, the downlink determination module 330 identifies vehicles 105 of interest. The downlink determination module 330 can identify vehicles 105 of interest based on a predetermined distance threshold. For example, the downlink determination module 330 can filter out vehicles 105 having a distance between those vehicles 105 and the ego vehicle 105 that is greater than the predetermined distance threshold, e.g., greater than two hundred meters (200 m) or the like.

At block 910, the downlink determination module 330 calculates a relevance weight for each neighboring vehicle 105 with respect to the ego-vehicle 105. For instance, the downlink determination module 330 may calculate a relevance weight that is relatively higher for a neighboring vehicle 105 that has a higher probability of colliding with the ego-vehicle 105, whether the sensors 115 of the ego-vehicle 105 are not detecting the neighboring vehicle 105, or the like. At block 915, the downlink determination module 330 randomly selects a neighboring vehicle 105 based on normalized risk values relative to the ego-vehicle 105. In other words, a neighboring vehicle 105 that has a higher risk value with respect to the ego-vehicle 105 has a greater chance of being selected as compared to a neighboring vehicle 105 that has a lower risk value with respect to the ego-vehicle 105.

At block 920, the downlink determination module 330 includes safety data pertaining to the selected vehicle 105 to a downlink update message. At block 925, a determination is made whether a size the downlink message has reached a downlink message size limit. If the size the downlink message is less than the size of the downlink message size limit, the process 900 returns to block 915. Otherwise, the downlink determination module 330 transmits a downlink update message including the safety data to the ego-vehicle 105. The process 900 then ends.

Figure 10:
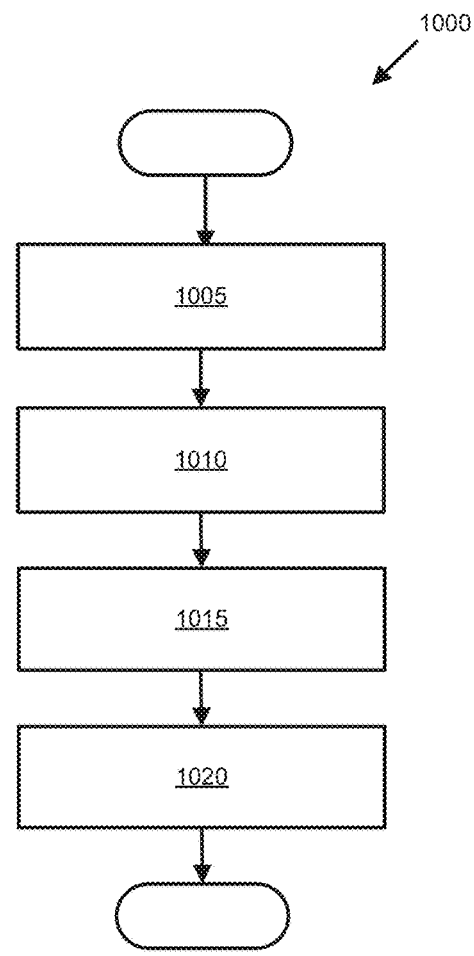
FIG. 10 is a flow diagram illustrating an example process for determining whether to modify a downlink frequency.

FIG. 10 illustrates an example process 1000 for determining whether to modify a downlink frequency. Blocks of the process 1000 can be executed by the server 145. At block 1005, the downlink determination module 330 converts a probability of a collision risk for a neighboring vehicle 105 relative to the ego-vehicle 105 to a downlink update frequency. The downlink determination module 330 can include a lookup table that relates the probability of a collision risk to downlink transmission frequencies. For example, a probability of a collision risk that is greater than fifty percent (50%) can be mapped to a downlink transmission frequency of ten Hertz (10 Hz). In another example, a probability of a collision risk that is less than or equal to one percent (1%) can be mapped to a downlink transmission frequency of one Hertz (1 Hz).

At block 1010, the downlink determination module 330 iterates through a list of neighboring vehicles 105 relative to the ego-vehicle 105. At block 1015, the downlink determination module 330 selects at least one of the neighboring vehicles 105 from the list when an update frequency of the at least one vehicle 105 is satisfied. At block 1020, the downlink determination module 330 transmits a downlink update message that includes the selected vehicles safety data to the ego-vehicle 105 at the determined downlink update frequency. The process 1000 then ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
    receive safety messages from a plurality of vehicles in communication with an edge server;
    determine, via the edge server, an uplink frequency recommendation for transmitting safety messages from at least one vehicle of the plurality of vehicles based on at least one of a position error or a collision risk;

transmit, from the edge server, the uplink frequency recommendation to the at least one vehicle; and determine, via the at least one vehicle, an uplink frequency based on the uplink frequency recommendation and a predetermined criterion, the predetermined criterion including a vehicle status determined by the vehicle, sensor data collected by the vehicle, or both the vehicle status determined by the vehicle and the sensor data collected by the vehicle.

2. The system of claim 1, wherein the processor is further programmed to determine a downlink frequency for transmitting safety messages to the at least one vehicle, wherein the transmitted safety messages comprise safety data corresponding to other vehicles of the plurality of vehicles.

3. The system of claim 2, wherein the processor is further programmed to determine the downlink frequency based on a probability of a collision between the at least one vehicle and another vehicle of the plurality of vehicles.

4. The system of claim 1, wherein the at least one vehicle is configured to fuse the uplink frequency recommendation and the predetermined criterion to thereby determine the uplink frequency, the fusing including applying a maximum function of the uplink frequency recommendation and the predetermined criterion.

5. The system of claim 1, wherein the processor is further programmed to receive safety messages from the at least one vehicle at an uplink frequency corresponding to the uplink frequency recommendation.

6. The system of claim 1, wherein the processor is further programmed to instantiate a plurality of frequency determination modules for each vehicle of the plurality of vehicles.

7. The system of claim 6, wherein the processor is further programmed to calculate a probability of a trajectory crossing for each pair of vehicles within the plurality of vehicles, wherein the probability of the trajectory crossing represents a probability of a collision.

8. The system of claim 7, wherein the processor is further programmed to provide the probability of the trajectory crossing to at least one frequency determination module.

9. The system of claim 1, wherein the processor is further programmed to receive sensor data from an infrastructure device (V2I device), the sensor data comprises sensed data pertaining to at least one vehicle of the plurality of vehicles.

10. The system of claim 9, wherein the vehicle-to-infrastructure (V2I) device comprises at least one of a roadside device, a traffic light, or a camera.

11. A method comprising:
receiving, at an edge server, safety messages from a plurality of vehicles in communication with the edge server;

determining, at the edge server, an uplink frequency recommendation for transmitting safety messages from at least one vehicle of the plurality of vehicles based on at least one of a position error or a collision risk;

transmitting, from the edge server, the uplink frequency recommendation to the at least one vehicle; and determining, at the at least one vehicle, an uplink frequency based on the uplink frequency recommendation and a predetermined criterion, the predetermined criterion including a vehicle status determined by the vehicle, sensor data collected by the vehicle, or both the vehicle status determined by the vehicle and the sensor data collected by the vehicle.

12. The method of claim 11, the method further comprising determining a downlink frequency for transmitting safety messages to the at least one vehicle, wherein the transmitted safety messages comprise safety data corresponding to other vehicles of the plurality of vehicles.

13. The method of claim 12, the method further comprising determining the downlink frequency based on a probability of a collision between the at least one vehicle and another vehicle of the plurality of vehicles.

14. The method of claim 11, wherein the at least one vehicle is configured to fuse the uplink frequency recommendation and the predetermined criterion to thereby determine the uplink frequency, the fusing including applying a maximum function of the uplink frequency recommendation and the predetermined criterion.

15. The method of claim 11, the method further comprising receiving safety messages from the at least one vehicle at an uplink frequency corresponding to the uplink frequency recommendation.

16. The method of claim 11, the method further comprising instantiating a plurality of frequency determination modules for each vehicle of the plurality of vehicles.

17. The method of claim 16, the method further comprising calculating a probability of a trajectory crossing for each pair of vehicles within the plurality of vehicles, wherein the probability of the trajectory crossing represents a probability of a collision.

18. The method of claim 17, the method further comprising providing the probability of the trajectory crossing to at least one frequency determination module.

19. The method of claim 18, the method further comprising receiving sensor data from a vehicle-to-infrastructure (V2I) device, the sensor data comprises sensed data pertaining to at least one vehicle of the plurality of vehicles.

20. The method of claim 19, wherein the vehicle-to-infrastructure (V2I) device comprises at least one of a roadside device, a traffic light, or a camera.

* * * * *